United States Patent [19]

Sherif

[11] 4,206,086
[45] Jun. 3, 1980

[54] ACTIVE AND DURABLE SULFURIC ACID CATALYST

[75] Inventor: Fawzy G. Sherif, Spring Valley, N.Y.

[73] Assignee: Stauffer Chemical Company, Westport, Conn.

[21] Appl. No.: 731,066

[22] Filed: Oct. 8, 1976

Related U.S. Application Data

[63] Continuation of Ser. No. 612,383, Sep. 11, 1975, abandoned.

[51] Int. Cl.$^2$ .......................... B01J 29/16; B01J 29/26
[52] U.S. Cl. ..................................... 252/456; 252/454; 423/522
[58] Field of Search .......................... 252/456; 423/522

[56] References Cited

U.S. PATENT DOCUMENTS

| 1,862,825 | 6/1932 | Laury | 252/456 X |
| 1,941,427 | 12/1933 | Beardsley et al. | 252/456 X |

*Primary Examiner*—Carl F. Dees

[57] ABSTRACT

The invention is a durable and active sulfuric acid catalyst prepared on a calcined and comminuted diatomaceous earth support containing primarily fresh water *Melosira granulata* diatoms.

11 Claims, 3 Drawing Figures

FIGURE I.

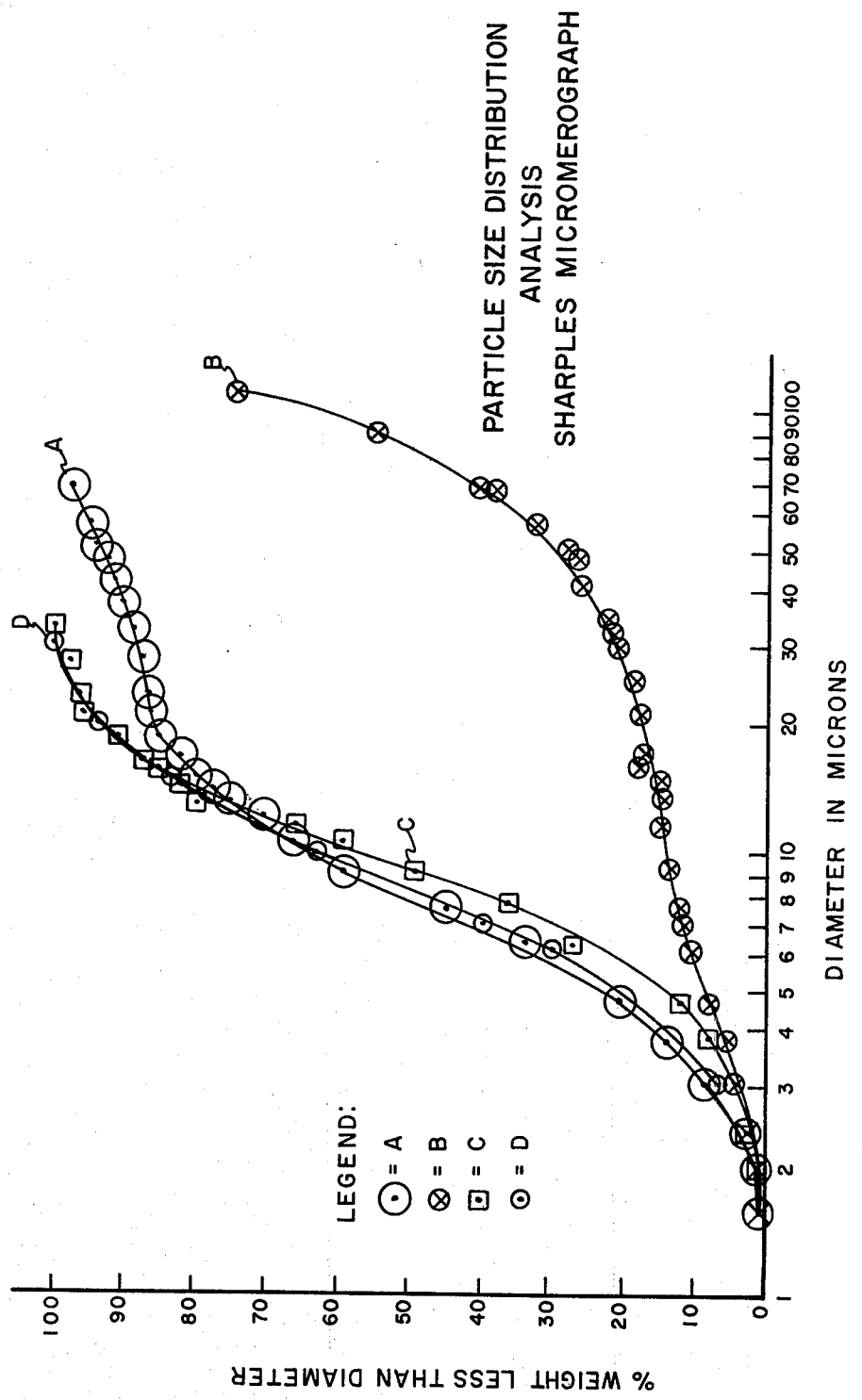

ACTIVE AND DURABLE SULFURIC ACID CATALYST

This is a continuation, of application Ser. No. 612,383 filed Sept. 11, 1975.

BACKGROUND OF THE INVENTION

Sulfuric acid is a backbone of industry. It is necessary for preparing many industrial products from fertilizers to pharmaceuticals and from petrochemicals to steel. In 1974 approximately 34.5 million tons of sulfuric acid were produced in the United States.

Sulfuric acid is usually prepared on a commercial scale by the gas phase oxidation of sulfur dioxide to sulfur trioxide followed by absorption of the sulfur trioxide in an aqueous medium. Modern industrial plants for preparing sulfuric acid usually utilize a supported vanadium contact catalyst for the oxidation of the sulfur dioxide to sulfur trioxide.

Throughout the history of the "contact sulfuric acid" process there has been a diligent search for active and durable sulfur dioxide oxidation catalyst which can be commercially prepared at a reasonable cost. Until this time a practitioner of the art on a commercial scale, had a choice between an active catalyst or a durable catalyst. The virtues of durability and high activity in a catalyst at a resonable price have eluded the diligent searches of catalyst manufacturers.

It is the object of the present invention to provide a durable and active sulfur dioxide oxidation catalyst. A further object of the present invention is to provide a durable and active sulfur dioxide oxidation catalyst which can be prepared at a reasonable cost. It is a further object of the present invention to provide a vanadium containing, durable and active sulfur dioxide oxidation catalyst which can be prepared without undue modification of existing equipment and procedures.

BRIEF SUMMARY OF THE INVENTION

According to the present invention, an active and durable vanadium containing sulfuric acid catalyst is provided which comprises shaped particles comprising vanadium compositions, promoters and activators supported on a calcined and finely comminuted diatomaceous earth which contains mainly the fresh water diatom *Melosira granulata*.

The vanadium compositions, promoters and activators comprise the active portion of the catalyst (herein noted as active material) and are well known in the art.

The support material comprises calcined and finely comminuted diatomaceous earth containing preferably 50% of the diatoms by weight of the fresh water diatom *Melosira granulata*. Higher proportions of the diatom *Melosira granulata* provide a more active and durable catalyst.

The support is calcined at a temperature above about 950° F. and below the temperature at which the structure of the silica in the diatom changes which is about 1850° F. The calcining reduces the amount of organic matter in the diatomaceous earth and at the higher temperatures the chemical composition is changed. Temperatures between about 1200° and 1800° F. are preferred.

The support must be finely comminuted since small particle size increases both the durability and activity of the catalyst prepared with the support.

DESCRIPTION OF THE DRAWINGS

FIG. 3 is a graph of particle size distribution of the diatomaceous earth supports employed in the examples set forth herein as determined by a Sharples Micromerograph TM.

DETAILED DESCRIPTION OF THE INVENTION

Figure 1:
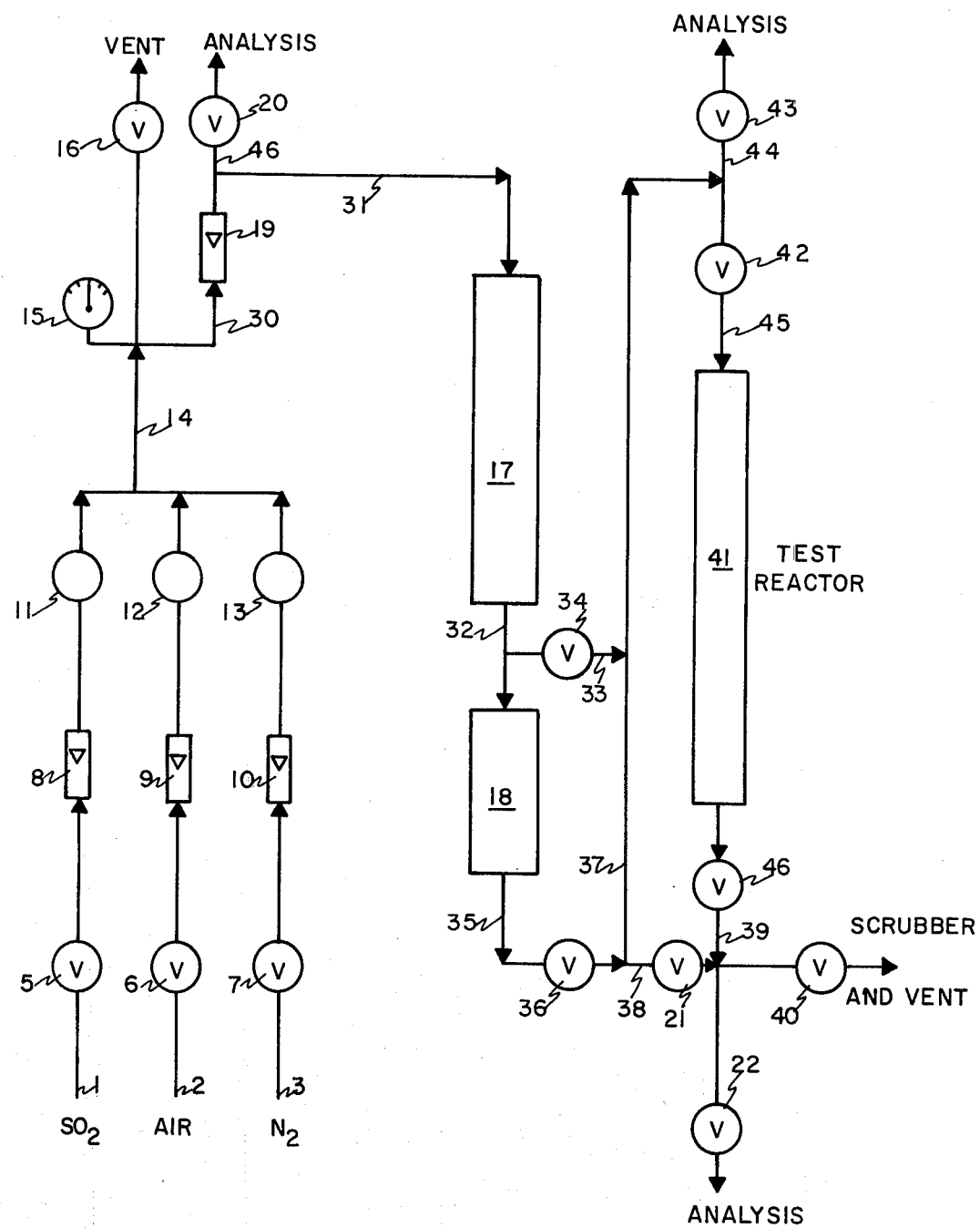
FIG. 1 is a diagrammatic drawing of the apparatus for determining catalyst activity.

In present day sulfuric acid practice, the sulfur dioxide oxidation catalyst is generally a supported vanadium composition which is "promoted" or "activated" by addition of certain alkali metal moieties and minor amounts of such compounds as cobalt, nickel, calcium, barium, iron and the like. The composition of such catalysts and the effect of various promoters and activators on the activity of the catalyst is well known as is discussed in Topsoe and Nielson, *Transactions of the Danish Academy of Technical Sciences*, No. 1, 1948, and Tandy, "The Role of Alkali Sulphates in Vanadium Catalysts for Sulfur Dioxide Oxidation", J. Applied Chemistry, Feb. 6, 1956, Pages 68–74.

The vanadium composition is usually supported on a carrier material for several reasons. The amount of expensive vanadium, the active material, in the catalyst can be reduced relative to the volume of catalyst required. Additionally, it is believed that the active vanadium composition is in the molten or plastic state at the temperature at which the catalyst is most active for oxidation of sulfur dioxide to sulfur trioxide in the sulfuric acid process. The active vanadium composition would fuse into a molten mass if it is not supported.

Many materials have been used as supports for vanadium compositions in sulfur dioxide oxidation catalysts. Materials such as alumina, pumice, silica gel, fullers earth, diatomaceous earth, zeolites and mixtures of these materials with various binders are disclosed in the literature as suitable supports for sulfur dioxide oxidation catalysts.

The catalyst is usually prepared in the form of discrete shaped particles. The particles can be in the form of spheres, cylindrical pellets, tablets or irregular particles graded to a desired particle size range. Shaping and sizing of the catalyst particles is important to minimize the pressure drop realized by the gases passing through the catalyst bed in the operation of the process.

Supported sulfur dioxide oxidation catalysts are generally prepared by two methods. In one method, a shaped support particle is prepared and the vanadium containing composition with the promoters and activators is intimately admixed with the shaped support particle. The shaped catalyst support can be impregnated with a solution of the catalytically active materials or the shaped particle can be intimately admixed with the active catalytic composition and the mixture heated to a temperature at which the catalytic composition becomes a fluid and flows over the surfaces of the shaped support.

Another method for preparing shaped, supported catalysts is to intimately admix the vanadium composition with the particulate support and subsequently shape the admixture to form the catalyst particles. The mixture to be shaped can be prepared by dry mixing the particulate support material with the active materials followed by the addition of a liquid to form a mixture of the proper consistency which can be shaped and which will retain the shaped configuration. The support can be mixed with a slurry of the active material followed by the addition of a controlled amount of water to obtain a mixture with a consistency suitable for shaping into the desired catalyst shape. The catalyst can also be prepared by admixing the catalyst support with a solution of the catalytic compositions and adjusting the amount of water to obtain a mixture of the consistency suitable for shaping.

Tableting presses, briquetting mills, pellet mills and the like are suitable means for shaping the mixture of the catalyst support and the active catalytic compositions into particles of the desired size and shape. Shaping means are well known in the art and require no elaboration at this point. It is preferable to use shaping means which also compact the mixture to form the shaped particles.

After the mixture containing the vanadium compounds, promoters and activators, and the support, is shaped, it is dried to remove the water utilized in the preparation.

The dried shaped particles are then contacted with an oxygen containing gas stream containing small amounts of from about 2 to about 6% of sulfur dioxide mixed with sulfur trioxide at a temperature in the range of from about 600° to 900° F. Reaction with the dilute sulfur dioxide containing gas stream activates the catalyst particles and after a suitable activation period, the shaped particles are suitable for use as a catalyst in a sulfur dioxide oxidation process.

The preparation of sulfur dioxide oxidation catalysts containing vanadium is discussed on Topsoe and Nielson, *Transaction of the Danish Academy of Technical Sciences*, supra.

The activation step which is sometimes called sulfating and the requirement that the catalyst be reacted with dilute sulfur dioxide containing gas streams to accomplish the activation is discussed in the Topsoe and Nielson article, supra.

Briefly, the activation is generally utilized since the unactivated catalyst reacts rapidly and irreversibly with sulfur dioxide at the elevated temperature of the sulfur dioxide oxidation reaction. The reaction of the sulfur dioxide with the catalyst is exothermic and the temperature of the catalyst can increase to a point at which the catalytic activity and structural integrity of the catalyst can be severely impaired. It is therefore the general practice to activate a vanadium containing sulfuric acid catalyst by contact with a dilute sulfur dioxide and sulfur trioxide containing gas stream before use in a commercial operation. Activation of sulfation of sulfur dioxide oxidation catalysts is well known in the art.

The catalyst of the present invention is, preferably, prepared by mixing the vanadium containing compositions and various promoters and activators (active material) with the novel diatomaceous earth support. The mixture of active material with the diatomaceous earth support in then adjusted to a proper consistency by addition or removal or water, and shaped into the required form. A suitable catalyst particle can also be prepared by drying a mixture of an aqueous solution or slurry of the active material with the novel support and crushing and screening the dried mixture to form irregular particles in a narrow size range. However, it is preferred to prepare the catalyst in the form of regular shaped particles since the particles provide for minimum pressure differentials through the catalyst bed.

The active materials can be dry mixed with the catalyst support followed by the addition of water to form a mixture with the desired consistency to be shaped. Another method suitable for preparing the supported catalyst of the present invention is to admix a slurry of the active materials with the catalyst support and adjusting the consistency of the mixture to that required for shaping.

The catalyst can also be prepared by admixing a solution of the active materials with the diatomaceous earth support and adjusting the amount of water in the mixture to provide a material with a consistency which can be readily formed into the desired catalytic particle shape.

It is not critical how the active materials are admixed with the catalyst support as long as an intimate admixture of the catalytic compositions with the catalyst support is obtained.

The active materials are well known in the sulfur dioxide oxidation catalyst are and the best method for admixing the active materials with the diatomaceous earth support would be dependent upon the particular composition chosen for making the catalyst. Vanadium pentoxide is a useful vanadium containing composition for preparing the sulfur dioxide oxidation catalyst of the present invention. The useful concentrations of vanadium compositions and the promoters and activators utilized in preparing a sulfur dioxide oxidation catalyst are well documented in the literature and will not be discussed herein.

The improved properties of the catalyst of the present invention, i.e., the combination of high activity and high durability, are achieved by use of a particular diatomaceous earth as the catalyst support. The diatomaceous earth useful in the practice of the present invention is a diatomaceous earth containing a major portion of the diatoms of the fresh water diatom *Melosira granulata*. As is known in the art, diatomaceous earth is a naturally occurring material which, after removal of water, contains primarily diatoms mixed with minor amounts of clay mineral type materials and organic impurities. The diatoms are primarily silicon dioxide. The amount of alumina in the diatomaceous earth reflects the amount of clay minerals admixed with the diatoms. The diatomaceous earth useful in the practice of the present invention generally contains from about 55 to about 90% by weight of the calcined diatomaceous earth of diatoms. The catalyst support should contain at least about 40% by weight of the calcined diatomaceous earth of the fresh water diatom *Melosira granulata* and most preferably from about 50 to about 80% of the diatom *Melosira granulata*. Higher proportions of the diatom *Melosira granulata* in the support increase the durability of the catalyst. The diatomaceous earth catalyst support preferably contains from about 2.5 to about 10.5% aluminum calculated as alumina ($Al_2O_3$).

Figure 2:
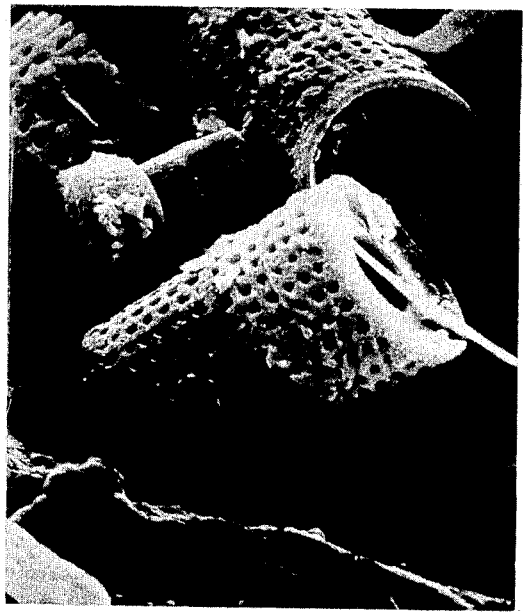
FIG. 2 is a scanning electron micrograph of the fresh water diatom *Melosira granulata* enlarged 3000 diameters.

FIG. 2 is a scanning electron micrograph showing the diatom *Melosira granulata* enlarged to 3000 diameters.

The support must be finely comminuted. The fine comminution increases the activity and also increases the durability of the catalyst. It is preferred that the diatomaceous earth support be comminuted so that at least about 25% by weight of the particles are smaller than about 10 microns and preferably at least about 40% by weight are smaller than 10 microns.

It is preferred that the maximum particles size be no larger than about 100 microns, but mixtures containing small amounts of particles over 100 micron can be useful in the practice of the invention.

The diatomaceous earth support can be readily prepared by grinding coupled with air classification methods.

The support must be calcined. The calcination increases the activity of the catalyst. The calcination is carried out by heating the diatomaceous earth to a temperature from about 950° to about 1850° F. and preferably from about 1200° to about 1800° F. The calcination can be carried out in a rotating kiln type apparatus.

The time of calcination is dependent on the temperature. Times from about 5 minutes to about 8 hours are suitable and from about 30 minutes to about 4 hours most preferred. Methods for calcining diatomaceous earth are well known in the art.

It is believed that calcination removes certain organic impurities from the diatomaceous earth. Calcination can also decompose carbonate impurities if they are present in the diatomaceous earth. The diatomaceous earth must not be heated to a temperature high enough to change the structure of the silica which makes up the individual diatoms. Little effect on the structure of the silica in the diatomaceous earth occurs at temperatures below about 1850° F.

It is preferred to calcine the diatomaceous earth support before admixture with the active materials and the shaping of the particles.

The activity of the catalysts shown in the examples was determined by measuring the conversions obtained by passing a gas stream containing sulfur dioxide, sulfur trioxide, oxygen and nitrogen over the catalysts at a controlled rate and temperature.

The activity of the catalyst was determined by measuring the amount of sulfur dioxide converted to sulfur trioxide in a partially reacted sulfur dioxide containing gas stream. A gas stream containing sulfur dioxide, oxygen and nitrogen is passed over a sulfur dioxide oxidation catalyst to convert from about 90 to about 97% of the sulfur dioxide to sulfur trioxide. The sulfur dioxide content of the partially converted gas stream is determined and the partially converted gas stream is passed over the catalyst to be tested. The catalyst being tested is maintained at a controlled temperature and the flow rate of sulfur dioxide containing gas contacting the catalyst is carefully controlled. The sulfur dioxide content of the gas stream before and after contact with the catalyst being tested is measured. An activity coefficient for the particular catalyst is determined from the concentration of oxygen, sulfur dioxide and sulfur trioxide in the gas stream entering the test reactor and the concentration of oxygen, sulfur dioxide and sulfur trioxide in the gas stream leaving the test reactor. The apparatus for catalyst testing is shown in FIG. 1.

Cylinders of dry sulfur dioxide, air and nitrogen properly pressure-reduced are connected to lines 1, 2 and 3, respectively. The systems for metering the gases are the same. The pressure-reduced gases at a pressure of about 10 pounds per square inch gauge (psig) enter the system and pass through shut-off valves 5, 6 and 7 in the sulfur dioxide, air and nitrogen lines. The gas is metered at a pressure of about 10 psig through rotometers 8, 9 and 10 and low flow control means 11, 12 and 13. The gases are mixed in line 14 at a pressure between 1 and 2 psig. The pressure in line 14 is monitored by pressure gauge 15. Vent valve in line 14 permits the mixture of gases to be passed to the vent until the required mixture of gases is obtained. The total flow of mixed gases passing through line 30 is measured by rotometer 19. The mixed gas stream is passed through line 31 to reactor 17. A sample can be taken through line 46 and valve 20 to determine the ratio of sulfur dioxide to oxygen in the gas stream.

Reactors 17 and 18 are electrically heated reactors and contain a sulfur dioxide oxidation catalyst. Reactors 17 and 18 are utilized to convert a portion of the sulfur dioxide in the gas stream to sulfur trioxide. One or two reactors are utilized depending upon the amount of preconversion desired for a particular run. The preconverted gas leaving reactor 17 passes through line 32 and can pass through line 33 and valve 34 to line 37 and directly to test reactor 41 through valve 42 and line 45. If additional preconversion is required the partially converted gas stream can be passed through reactor 18, line 35 and valve 36 to line 37 which passes the preconverted gas to test reactor 41.

A sample of the preconverted gas in line 37 is removed from the system through line 44 and valve 43 for analysis. The preconverted gas stream is passed through valve 42 and line 45 to test reactor 41.

Test reactor 41 is immersed in a fluidized sand bath which is temperature controlled to maintain the proper temperature in the reactor. The test reactor 41 is 1 inch inside diameter. Fifty cubic centimeters of catalyst is introduced into the reactor for testing. The fully converted gas stream is passed through valve 46 in line 39 and passed through valve 40 to the scrubber and the vent. A sample for analysis can be taken from the system through valve 22.

Reactor 41 can be by-passed by passing the preconverted gas through line 38 and valve 21 to line 39.

During testing of a catalyst the sulfur dioxide concentration in the gas stream entering the test reactor through line 45 and leaving the reactor through line 39 are monitored. The gas mixture entering the preconverters through line 31 is adjusted to contain about 9.5% $SO_2$, about 11.4% $O_2$ and the balance, nitrogen. The catalyst being tested is equilibrated by passing the preconverted gas stream over the catalyst at the test temperature for 2 hours before sampling the gas stream. The sulfur dioxide concentration in the preconverted gas stream and in the gas stream after contact with the catalyst being tested is determined by iodometric titration.

The amount of sulfur dioxide and oxygen in the gas stream entering and leaving the test reactor is measured. The rate constant k was computed from the data using the following rate expression.

rate = $k(P_{SO_2}/P_{SO_3})^{0.5} \cdot PO_2[1-(P_{SO_3}/P_{O_2}^{0.5}P_{SO_2}keq)^{0.5}]$
where keq = equilibrium constant $$\log = \frac{5186.5}{T_A} + 0.611 \text{ by } T_A - 6.7497$$

$T_A$ = temperature, °K.
$P_{SO_2}$ = Partial pressure of $SO_2$ in atmospheres.
$P_{SO_3}$ = Partial pressure of $SO_3$ in atmospheres formed by contact with the catalyst being tested.
$P_{O_2}$ = Partial pressure of $O_2$ in atmospheres.

$$\text{The rate constant } k = \frac{g \text{ moles } SO_2 \text{ converted}}{\text{atmos} \times \text{second} \times \text{gram catalyst}}$$

The rate constant k reported herein = k X bulk density of sulfated catalyst in grams per cubic centimeter.

The durability of the catalyst (Accelerated Abrasion Loss) is measured by heating 150 grams of the fresh catalyst pellets at 1500° F. for 24 hours. The catalyst pellets after heating at 1500° F. for 24 hours are contacted with a gas mixture containing about 4.0% $SO_2$ and about 5.0% $SO_3$ for 2 hours at 810° F. A 100 gram sample of the heated and reacted catalyst is shaken over a standard 20 mesh sieve, U.S. Sieve Series, for 1 hour using a Rotap shaker. The loss in weight after shaking for 1 hour indicates the durability of the catalyst. The durability of the catalyst is indicated as the percent loss through the 20 mesh screen. The lower numbers indicate a more durable catalyst. The Accelerated Abrasion Loss test has been found to correlate closely with durability experienced with sulfur dioxide oxidation catalysts under commercial process operating conditions.

The invention will be more fully illustrated by reference to the following examples.

EXAMPLE 1

A test catalyst was prepared by dry mixing 109 parts of vanadium oxide with 302 parts of anhydrous potassium sulfate. Diatomaceous earth in an amount of 830 parts is admixed with the dry vanadium pentoxide and anhydrous potassium sulfate. Water is added and thoroughly mixed with the solid mixture in a sufficient amount to form a damp mixture suitable for extrusion. The damp mixture is extruded into pellets 7/32 inch diameter by ⅜ to ⅝ inch long. The pellets are dried at 250° F. for 8 hours. The catalyst pellets are heated at 1000° F. for 4 hours and activated by contact with a dilute sulfur dioxide-sulfur trioxide containing gas stream at 810° F. before testing.

The diatomaceous earth is a natural product containing about 63% by weight of the calcined diatomaceous earth of the fresh water diatom *Melosira granulata* which has been calcined at 1600° F. for 1 hour and milled to an average particle size by weight of about 9 microns. The particle size distribution of the calcined and milled diatomaceous earth is shown in Table 1.

TABLE 1
PARTICLE SIZE DISTRIBUTION OF DIATOMACEOUS EARTH

| SIZE MICRONS | CUMULATIVE DISTRIBUTION |
|---|---|
| Less than 5 | 20% |
| Less than 10 | 60% |
| Less than 20 | 85% |
| Less than 50 | 95% |
| Less than 100 | 99% |

The plot of a Micromerograph ™ distribution of particle sizes is shown in FIG. 3 as curve A. The properties of the diatomaceous earth were as follows:

| Surface Area - meters²/gram | 11-16 |
|---|---|
| Pore Volume - cubic centimeters/gm. | 0.8 |
| $Al_2O_3$ | 9.3% |
| $SiO_2$ | 86.8% |
| Loss on Ignition | 0.9% |

EXAMPLE 2

A catalyst was prepared according to the procedure of Example 1. The support was the unmilled calcined diatomaceous earth of Example 1. The particle size distribution as measured by Micromerograph ™ appears as curve B in FIG. 3.

EXAMPLE 3

A catalyst was prepared according to the method of Example 1. The support is an uncalcined, finely comminuted fresh water diatomaceous earth. The support contained about 63% by weight of the diatomaceous earth of the diatom *Melosira granulata* (on a calcined basis). The particle size distribution of the diatomaceous earth as measured by Micromerograph ™ is shown as curve C in FIG. 3.

EXAMPLE 4

A catalyst was prepared according to the method of Example 1 utilizing the diatomaceous earth of Example 3 which was heated at about 1600° f. for one hour before admixture with the active materials.

EXAMPLE 5

A catalyst was prepared according to the method of Example 1 except the support is an uncalcined, finely comminuted salt water diatomaceous earth. The particle size distribution of the diatomaceous earth is measured by Micromerograph ™ and shown as curve D in FIG. 3.

EXAMPLE 6

A catalyst was prepared according to the method of Example 1 using the same diatomaceous earth as in Example 1. Potassium sulfate was added in only 167 parts and 284 parts of Cesium sulfate were added to the formulation.

The catalysts prepared in Examples 1 through 6 were tested in an apparatus as shown in FIG. 1. The sulfur dioxide was preconverted to between 90 and 97% and passed over 50 cubic centimeters of catalyst at the rate of 21 cubic centimeters per second. The rate constant was determined at a temperature of 760° F. and 810° F.

The Accelerated Abrasion Loss values (AAL) were determined according to the method disclosed above.

Two samples of commercially available contact sulfur dioxide catalyst were also tested to show the advantages of the catalyst of the invention.

The results of the tests of the two commercial catalysts are shown as Examples 7 and 8 in Table 2.

The results of the evaluation tests are set forth in Table 2.

TABLE 2

| Example Number | Support Type | Activity Constant $k \times 10^{-7}$ 760° F. | Activity Constant $k \times 10^{-7}$ 810° F. | Accelerated Abrasion Loss Percent |
|---|---|---|---|---|
| 1 | Fresh Water Diatomaceous Earth, Calcined Before Grinding, Finely Ground | 37 | 160 | 1.5 |
| 2 | Fresh Water Diatomaceous Earth, Calcined, Coarsely Ground | 26 | 110 | 6.5 |
| 3 | Fresh Water Diatomaceous Earth, Uncalcined, Finely Ground | 16 | 103 | 3.0 |
| 4 | Fresh Water Diatomaceous | 43 | 130 | 3.0 |

TABLE 2-continued

| Example Number | Support Type | Activity Constant k × 10⁻⁷ 760° F. | 810° F. | Accelerated Abrasion Loss Percent |
|---|---|---|---|---|
| | Earth, Calcined After Grinding, Finely Ground | | | |
| 5 | Salt Water Diatomaceous Earth, Uncalcined, Finely Ground | 27 | 110 | 17.5 |
| 6 | Fresh Water Diatomaceous Earth, Calcined Before Grinding, Finely Ground | 73 | 205 | 2.0 |
| 7 | Commercial Catalyst A* | 17 | 162 | 1.2 |
| 8 | Commercial Catalyst B** | 44 | 183 | 3.5 |

*Commercial Catalyst A - Monsanto 210
**Commercial Catalyst B - Monsanto 11

The test results clearly indicate that it is necessary to finely comminute the fresh water diatomaceous earth consisting primarily of *Melosira granulata* diatoms and calcine the material to obtain a catalyst with high activity and high durability.

The catalyst prepared with the uncalcined finely comminuted diatomaceous earth is a durable catalyst but its activity is relatively low.

The calcined but coarsely ground diatomaceous earth produces a catalyst with a higher activity but low durability. If the catalyst support is calcined and finely comminuted, the catalyst achieves a high activity and maintains a high durability.

It is not critical that the diatomaceous earth be calcined before being comminuted as shown by Example 4 in comparison to the catalyst of Example 1.

The catalyst of the present invention combines the durability of commercial catalysts of low activity with the activity of high activity commercial catalysts.

The catalysts utilized in the examples presented herein were prepared using only one concentration of vanadium in the form of an oxide so that the effects of treatment of the catalyst support could be clearly shown. Concentration of active materials in sulfur dioxide oxidation catalysts and ratios of promoters and activators to vanadium are well known in the art. The support of the present invention imparts desirable properties to catalysts within the ranges of concentration of active materials utilized in the art.

The active materials may be in soluble or insoluble form and can be admixed with the novel calcined finely comminuted support in a dry state, as a solution or suspension. The form of the active materials is not important but intimate admixture with the catalyst support must be achieved. Vanadium compounds, activators and promoters suitable for preparing supported sulfur dioxide oxidation catalysts are well known in the art.

The examples clearly show that active and durable catalysts can be prepared by utilizing as a catalyst support, a calcined finely comminuted fresh water diatomaceous earth containing primarily diatoms of *Melosira granulata*.

What is claimed is:

1. In a catalyst for the oxidation of sulfur dioxide to sulfur trioxide wherein a diatomaceous earth support is mixed with vanadium compounds, promoters and activators and the support which is mixed with the vanadium compounds, promoters and activators, is shaped the improvement which comprises providing a catalyst of high durability and high activity by utilizing as a support a finely comminuted fresh water diatomaceous earth, containing at least about 40% by weight of the calcined diatomaceous earth of *Melosira granulata* diatoms, which has been calcined at a temperature from about 950° F. to about 1850° F.

2. The catalyst of claim 1 wherein the diatomaceous earth is calcined from 30 minutes to 4 hours at a temperature from about 1300 to about 1800° F. before admixture with the vanadium compounds, promoters and activators.

3. The catalyst of claim 1 wherein the diatomaceous earth contains from about 50 to about 80% by weight *Melosira granulata* diatoms.

4. The catalyst of claim 1 wherein the diatomaceous earth is comminuted so that at least about 25% by weight of the particles are smaller than 10 microns.

5. The catalyst of claim 2 wherein the diatomaceous earth is comminuted so that at least about 25% by weight of the particles are smaller than 10 microns.

6. The catalyst of claim 2 wherein the diatomaceous earth is comminuted so that at least about 40% by weight are smaller than 10 microns.

7. The catalyst of claim 2 wherein the diatomaceous earth contains from about 50 to about 80% by weight *Melosira granulata* diatoms and is comminuted so that about 40% by weight of the particles are smaller than 10 microns.

8. The method for preparing a durable and active catalyst for the oxidation of sulfur dioxide to sulfur trioxide which comprises (a) calcining fresh water diatomaceous earth, containing at least 40% by weight of the calcined diatomaceous earth of *Melosira granulata* diatoms, at a temperature from about 1200° to about 1800° F., for from about 5 minutes to 8 hours; (b) comminuting, before or after calcining, the diatomaceous earth so that at least about 25% by weight of the particles are smaller than about 10 microns; (c) admixing vanadium compounds, water, promoters and activators with said calcined and comminuted diatomaceous earth; (d) shaping and compacting the mixture to form a catalyst particle; and (e) drying and activating the particles to form a sulfuric acid catalyst.

9. A supported vanadium containing sulfur dioxide oxidation catalyst wherein the support is a calcined finely comminuted fresh water diatomaceous earth containing at least about 40 percent by weight of the calcined diatomaceous earth of *Melosira granulata* diatoms.

10. The catalyst of claim 9 wherein the support contains from about 40 percent to about 80 percent by weight of *Melosira granulata* diatoms.

11. The catalyst of claim 1 wherein the catalyst contains Cesium as a promoter and activator.

* * * * *

UNITED STATES PATENT AND TRADEMARK OFFICE
CERTIFICATE OF CORRECTION

PATENT NO. : 4,206,086
DATED : June 3, 1980
INVENTOR(S) : Fawzy G. Sherif

It is certified that error appears in the above-identified patent and that said Letters Patent are hereby corrected as shown below:

Col. 1, line 26 - there should be a comma after "of the art" and before "on a commercial scale".

Col. 1, line 29 - "resonable" should be -- reasonable --.

Col. 4, line 23 - sulfur dioxide oxidation catalyst "are" should be sulfur dioxide oxidation catalyst -- art --.

Col. 4, line 23 - "method" should be -- methods --.

Col. 5, line 5 - "micron" should be -- microns --.

Col. 6, in the chemical equation -

$$"log = \frac{5186.5}{T_A} + 0.611 \text{ by } T_A - 6.7497"$$

should be -- $\log k_{eq} = \frac{5186.5}{T_A} + 0.611 \text{ by } T_A - 6.7497$ --.

Col. 8, line 48 - "catalyst" should be -- catalysts --.

Signed and Sealed this

Fifth Day of August 1980

[SEAL]

Attest:

SIDNEY A. DIAMOND

Attesting Officer    Commissioner of Patents and Trademarks